(12) United States Patent
Zehnle et al.

(10) Patent No.: US 12,228,486 B2
(45) Date of Patent: Feb. 18, 2025

(54) METHOD FOR VERIFYING A DENSITY AND/OR VISCOSITY MEASURING DEVICE IN A MEASURING STATION

(71) Applicant: TrueDyne Sensors AG, Reinach (CH)

(72) Inventors: Steffen Zehnle, Lörrach (DE); Christof Huber, Bern (CH); Josua Ritter, Reinach (CH)

(73) Assignee: TrueDyne Sensors AG, Reinach (CH)

( * ) Notice: Subject to any disclaimer, the term of this patent is extended or adjusted under 35 U.S.C. 154(b) by 282 days.

(21) Appl. No.: 17/286,116

(22) PCT Filed: Sep. 16, 2019

(86) PCT No.: PCT/EP2019/074708
§ 371 (c)(1),
(2) Date: Apr. 16, 2021

(87) PCT Pub. No.: WO2020/083568
PCT Pub. Date: Apr. 30, 2020

(65) Prior Publication Data
US 2021/0372907 A1    Dec. 2, 2021

(30) Foreign Application Priority Data
Oct. 22, 2018 (DE) ...................... 10 2018 126 230.2

(51) Int. Cl.
*G01N 11/02* (2006.01)
*G01N 9/00* (2006.01)

(52) U.S. Cl.
CPC .............. *G01N 11/02* (2013.01); *G01N 9/00* (2013.01)

(58) Field of Classification Search
CPC .................................. G01N 11/02; G01N 9/00
See application file for complete search history.

(56) References Cited

U.S. PATENT DOCUMENTS

| 5,072,416 A | 12/1991 | Francisco, Jr. et al. |
| 5,661,232 A * | 8/1997 | Van Cleve ............. G01N 11/04 73/32 R |

(Continued)

FOREIGN PATENT DOCUMENTS

| CN | 1213431 A | 4/1999 |
| DE | 9200180 U1 | 3/1992 |

(Continued)

OTHER PUBLICATIONS

JP-3224828-B2 (Year: 2001).*

(Continued)

*Primary Examiner* — Kristina M Deherrera
*Assistant Examiner* — Fatemeh Esfandiari Nia
(74) *Attorney, Agent, or Firm* — Christopher R. Powers; Endress+Hauser (USA) Holding, Inc.

(57) ABSTRACT

A method for verifying a density and/or viscosity measuring device in a measuring station of a process installation during ongoing operation, in which a medium flows through a main channel of the process installation, comprising steps: providing a side channel, which is connected as a bypass of the main channel, wherein the side channel is fluidically connected to the main channel via two regions of the main channel with mutually differing diameters; providing a MEMS-based master or control density measuring device in the side channel such that the MEMS-based master or control density measuring device is flowed through by the medium; performing at least one verification measurement with the MEMS-based master or control density measuring device; and verifying the density and/or viscosity measuring device based on the at least one verification measurement performed by the MEMS-based master or control density measuring device.

18 Claims, 3 Drawing Sheets

(56) References Cited

U.S. PATENT DOCUMENTS

| | | | |
|---|---|---|---|
| 10,058,830 B2* | 8/2018 | Somenzi | B01F 25/50 |
| 2004/0216509 A1 | 11/2004 | Antonijevic | |
| 2008/0221822 A1 | 9/2008 | Laverdiere et al. | |
| 2010/0313647 A1* | 12/2010 | Terabayashi | E21B 47/10 |
| | | | 73/152.55 |
| 2015/0285700 A1 | 10/2015 | Blatherwick et al. | |
| 2018/0246024 A1 | 8/2018 | Huber et al. | |
| 2020/0393279 A1* | 12/2020 | Reith | G01N 9/002 |

FOREIGN PATENT DOCUMENTS

| | | | | |
|---|---|---|---|---|
| DE | 102014101647 A1 | 8/2014 | | |
| DE | 102011100029 C5 | 10/2016 | | |
| DE | 102015110711 A1 | 1/2017 | | |
| DE | 202018003136 U1 | 8/2018 | | |
| DE | 202018003137 U1 | 8/2018 | | |
| DE | 202018003138 U1 | 8/2018 | | |
| EP | 0874976 A1 | 11/1998 | | |
| JP | H0549464 A * | 11/2001 | | |
| JP | 3395079 B2 * | 4/2003 | | G01G 17/04 |
| WO | WO-2017071864 A1 * | 5/2017 | | G01F 1/8404 |

OTHER PUBLICATIONS

JP-3395079-B2—English (Year: 2003).*
Smith, Richard, et al. "A MEMS-based Coriolis mass flow sensor for industrial applications." IEEE Transactions on Industrial Electronics 56.4 (2008): 1066-1071. (Year: 2008).*
WO-2017071864-A1 (Year: 2017).*
Kalotay, Paul, Density and viscosity monitoring systems using Coriolis flow meters, ISA Transactions 38 (1999), pp. 303-310.

* cited by examiner

METHOD FOR VERIFYING A DENSITY AND/OR VISCOSITY MEASURING DEVICE IN A MEASURING STATION

CROSS-REFERENCE TO RELATED APPLICATIONS

The present application is related to and claims the priority benefit of German Patent Application No. 10 2018 126 230.2, filed on Oct. 22, 2018, and International Patent Application No. PCT/EP2019/074708, filed on Sep. 16, 2019, the entire contents of which are incorporated herein by reference.

TECHNICAL FIELD

The invention relates to a method for verifying a density and/or viscosity measuring device in a measuring station of a process installation during ongoing operation and to an apparatus for checking a density and/or viscosity measuring device in a measuring station of a process installation during ongoing operation of the process installation by means of a MEMS-based master or control density measuring device.

BACKGROUND

Density and/or viscosity measuring devices are especially used to register density and/or viscosity of a medium in a process installation during ongoing operation, i.e., in the case of executing a process continuously. The registering of the density and/or viscosity occurs, in such case, in the presence of process conditions needed for performing the process. These process conditions concern, especially, temperature and pressure.

To assure reliability of the results of measurement, these measuring devices must be periodically checked. There are different options available for performing this checking. These are:
  sample taking in open container and measuring with a hydrometer or alternatively with a mobile handheld densimeter based on an oscillating U-tube in the field. This method has the disadvantage that the measuring cannot occur at process pressure. This is particularly problematic in the case of media with easily volatile portions (vapor pressures significantly under one bar absolute), since the sample, thus, changes between the sample taking and the sample measuring; and
  sample taking in closed container and subsequent measuring in the laboratory with a pycnometer or a laboratory measuring device based on the oscillating U-tube method. With these laboratory measurements, the accuracy of measurement is greater than in the case of measuring in the field. However, also in this case, measuring cannot be performed in the presence of process conditions (T and p). Moreover, volatile portions can easily evaporate, even in a closed bottle, and escape upon opening. The sample is, thus, even in this case, potentially corrupted.

Measurements in the field at process pressure by means of a pressure pycnometer serve for providing a precise, reproducible volume of a medium in a glass or metal piston. By weighing the empty and filled piston, the density of the medium can be ascertained. If one applies robust and insulated, metal pistons equipped with pressure and temperature measuring devices, the measuring can also occur at high pressures and at process temperatures. The measuring method is, with careful work and complex cleaning and test procedures, very exact and offers the opportunity of measuring at process pressures and process temperatures. Problematic, however, is the complex cleaning of the piston. Especially in the case of viscous media having high viscosity, residues of the medium can remain on a wall of the piston and, thus, influence the result.

Disadvantageous in all described methods is that the medium must be disposed of after the measuring.

To do something about this disadvantage, recently efforts have been made to establish another test method for industry. To this end, a master or control density measuring device is provided, which is installed in the plant in series with the measuring device to be checked/verified. The installation occurs, in such case, in such a manner that a branch path is provided, in which the master or control density measuring device can be connected. In order, as much as possible, to not change the flow of the medium through the plant, the branch path is matched to the actual process path, in which the measuring device is located, i.e., the branch path has, for example, nominal tube diameters equal to those of the process path and/or is connected in series therewith. Such measures are not only very time consuming to implement, but, also, are relatively expensive.

SUMMARY

It is, therefore, an object of the present invention to overcome the disadvantages of the above described state of the technology.

The object is achieved according to the invention by the methods and by the apparatuses of the present disclosure.

The method of the invention for verifying a, preferably certification obligatory, density and/or viscosity measuring device in a measuring station of a process installation during ongoing operation, in which a medium, especially a hydrocarbon containing medium, flows through a main channel of the process installation, includes steps as follows:
  providing a side channel, which is connected as a bypass of the main channel, wherein the side channel is fluidically connected to the main channel via two regions of the main channel with mutually differing diameters;
  providing a MEMS-based master or control density measuring device in the side channel, so that the MEMS-based master or control density measuring device is flowed through by the medium;
  performing at least one verification measurement with the MEMS-based master or control density measuring device;
  verifying the density and/or viscosity measuring device based on the at least one verification measurement performed by the MEMS-based master or control density measuring device.

The method of the invention has many advantages compared with the above described methods, for example:
  The verification measurements occur continuously under actual process conditions and can be performed and repeated when required.
  No special equipment is necessary, such as sample container for measuring with a hydrometer or sample bottles for subsequent measuring in the laboratory, or special connections, with gate valves, pressure and temperature sensors plus a scale with reference weights for measuring with a pressure pycnometer in the field.
  The measuring is simple and less failure susceptible.
  The measuring can, when required, be automated.

This measuring method is especially advantageous in the case of applications, in which the density of the medium rapidly changes.

No medium is lost and, thus, also no waste is produced.

An advantageous form of embodiment of the method of the invention, includes, furthermore, the following step:

providing a main channel adapter, which is arranged in or at the main channel and which is adapted to control flow of the medium through the side channel in such a manner that the side channel is only flowed through by the medium, when the MEMS-based master or control density measuring device is mechanically connected to the main channel adapter.

Another advantageous form of embodiment of the method of the invention, includes, furthermore, the following step:

providing at least one replaceable filter element in the side channel, preferably as part of a sensor adapter, wherein the filter element is arranged in the flow direction before the MEMS-based master or control density measuring device, so that the medium is filtered before entry into the MEMS-based master or control density measuring device.

Especially, the forms of embodiment can provide that the MEMS-based master or control density measuring device is connected releasably to the main channel adapter and, thus, is flowed through by the medium only for the at least one verification measurement and/or that the MEMS-based master or control density measuring device is disconnected from the main channel adapter after the at least one verification measurement in ongoing operation. The main channel adapter is preferably provided upon the building of the process installation and correspondingly arranged in the main channel, so that it remains continuously in the plant. Because of the continuous remaining of the main channel adapter in the plant, the later connecting of the master or control density measuring device to the main channel adapter for performing the verification measurement is possible without tools.

Another advantageous form of embodiment of the method of the invention provides that the MEMS-based master or control density measuring device is checked, preferably recurringly, especially preferably in a laboratory with a reference medium, which was measured preferably by means of a measuring procedure based on a national standard. Especially, the form of embodiment can provide that the MEMS-based master or control density measuring device is applied at another measuring station for verifying another density and/or viscosity measuring device and the other measuring station has preferably an additional main channel adapter, to which the MEMS-based master or control density measuring device is mechanically connected.

Another advantageous form of embodiment of the method of the invention provides that the MEMS-based master or control density measuring device is mounted sealed at the main channel adapter.

Another advantageous form of embodiment of the method of the invention provides that for verifying the density and/or viscosity measuring device a temperature and/or a pressure representative for the measuring station in ongoing operation is taken into consideration.

The invention relates further to an apparatus for verifying a, preferably certification obligatory, density and/or viscosity measuring device in a measuring station of a process installation during ongoing operation by means of a MEMS-based master or control density measuring device, wherein the measuring station has at least the following:

a main channel, through which in ongoing operation of the process installation a medium, especially a hydrocarbon, flows, wherein the main channel has at least two regions with mutually differing diameters;

the density and/or viscosity measuring device arranged in or at the main channel for determining a primary density and/or viscosity variable of the medium;

a side channel, which is connected in the two regions fluidically to the main channel in such a manner that the side channel is connected as a bypass of the main channel;

a main channel adapter, which is arranged in or at the main channel and which is adapted to control flow of the medium through the side channel in such a manner that the medium only flows through the side channel when the MEMS-based master or control density measuring device is mechanically connected to the main channel adapter;

the MEMS-based master or control density measuring device arranged in the side channel for determining the density and/or viscosity value of the medium during ongoing operation, wherein the density and/or viscosity value serves for verifying the primary density and/or viscosity variable determined by the density and/or viscosity measuring device.

An advantageous embodiment of the apparatus of the invention includes, furthermore, a sensor adapter comprising the MEMS-based master or control density measuring device, wherein the sensor adapter and the main channel adapter are matched to one another in such a manner that the sensor adapter is connectable mechanically releasably to the main channel adapter and, furthermore, that only in a connected state does medium flow through the side channel formed in the main channel adapter and sensor adapter.

Especially, the embodiment can provide that the sensor adapter has, furthermore, at least one replaceable filter element, which is arranged in the flow direction before the MEMS-based master or control density measuring device, so that the medium is filtered before entry into the MEMS-based master or control density measuring device and/or that the sensor adapter has a preferably laterally accessible, filter holder, which is embodied to hold the filter element in an installed position in the sensor adapter, so that the filter element is flowed through by the medium and, furthermore, is embodied, when required, to eject the filter element, preferably laterally, so that the filter element can be replaced.

Another advantageous embodiment of the apparatus of the invention includes, furthermore, another measuring station with an additional main channel adapter for the mechanical and fluidic connection of the MEMS-based master or control density measuring device.

Another advantageous embodiment of the apparatus of the invention includes, furthermore, a flow computer, which is adapted to verify the primary density and/or viscosity variable of the medium ascertained by the density and/or viscosity measuring device based on the density and/or viscosity value of the medium ascertained by the MEMS-based master or control density measuring device in ongoing operation of the process installation.

Especially, the embodiment can, furthermore, include a temperature and/or pressure measuring device for determining a temperature and/or a pressure representative for the medium flowing through the measuring station, wherein the temperature and/or the pressure is supplied to the flow computer and the flow computer is adapted, furthermore, to take into consideration the temperature and/or the pressure representative for the measuring station for verifying the primary density and/or viscosity variable.

Another advantageous embodiment of the apparatus of the invention provides that the main channel adapter and the sensor adapter have a rapid coupling system, which implements a fluidic connecting of a part of the side channel formed in the main channel adapter to a part of the side channel formed in the sensor adapter. Especially, the apparatus can provide that the rapid coupling system is embodied in such a manner that the two parts of the side channel can be disconnected from one another after the fluidic connecting. The rapid coupling system can, furthermore, be so embodied that the two parts of the side channel can be connected fluidically with one another in ongoing operation under pressure, when the sensor adapter is placed mechanically on the main channel adapter. In such case, no tool is required for mounting and dismounting of the sensor adapter in the field.

BRIEF DESCRIPTION OF THE DRAWINGS

The invention will now be explained in greater detail based on the appended drawing, the figures of which show as follows.

DETAILED DESCRIPTION

Figure 1:
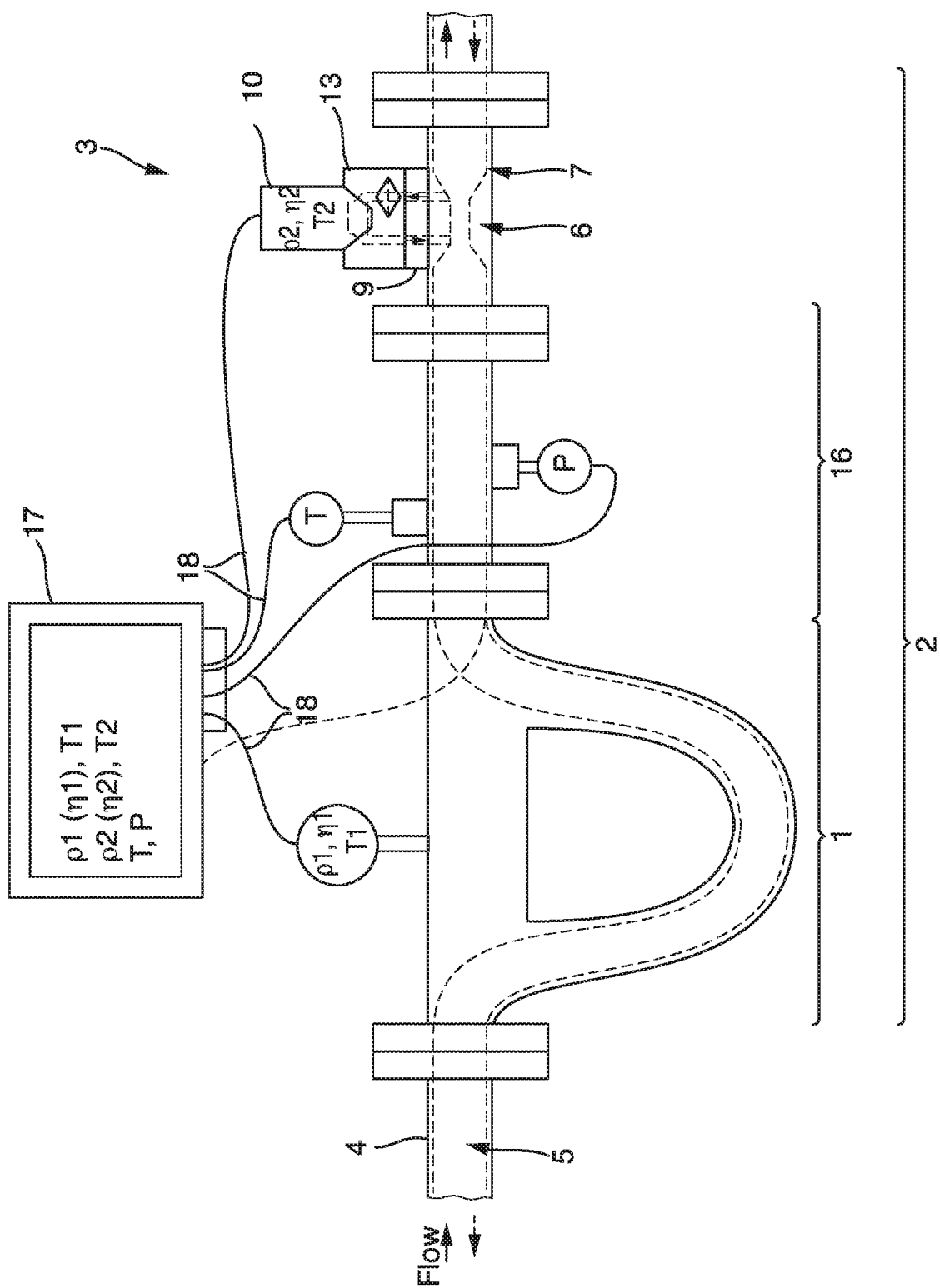
FIG. 1 shows a schematic view of a first, general example of an embodiment of the present disclosure.

FIG. 1 shows, by way of example, a section of a process installation 3, in which a process is performed. The process installation 3 includes in one section a density and/or viscosity measuring device 1, for example, a Promass Q instrument of the firm, Endress+Hauser. Of course, it can, in such case, also be some other Coriolis flow and/or density and/or viscosity measuring device. The density and/or viscosity measuring device 1 serves, in a certified operation, to register the density $\rho_1$ and/or viscosity $\eta_1$ of the medium at a measuring station 2 of the process installation 3. Furthermore, the density and/or viscosity measuring device 1 can serve to register a first temperature $T_1$, which is used preferably for ascertaining the density $\rho_1$ and/or viscosity Following the density and/or viscosity measuring device 1 is a temperature and pressure measuring device 16, which is embodied to ascertain a temperature T and a pressure p representative for the medium flowing through the measuring station. Following this measuring unit composed of density and/or viscosity measuring device 2 and temperature and pressure measuring device 16 is, in turn, a MEMS-based master or control density measuring device 10, which is connected via a main channel adapter 9 and which is embodied to determine a verification density $\rho_2$ and/or verification viscosity $\eta_2$. Furthermore, the master or control density measuring device can register a second temperature $T_2$, which is used preferably for ascertaining the density $\rho_2$ and/or viscosity $\eta_2$. The MEMS-based master or control density measuring device 10 is, in contrast to the two other measuring devices, only connected temporarily into the measuring station, to perform a verifying of the density and/or viscosity measuring device 10 working in certified operation.

The process installation 3 can, furthermore, include a volume conversion device 17, subsequently also referred to as a flow computer, which is adapted in certified operation to calculate a volume flow of the medium through the measuring station under standard conditions. For this, the flow computer 17 is fed the density $\rho_1$, viscosity $\eta_1$ and, in given cases, first temperature $T_1$ ascertained by the density and/or viscosity measuring device 1 as well as the temperature T and pressure p ascertained by the temperature and pressure measuring device 16. Furthermore, the flow computer 17 for verifying the certification obligatory, density and/or viscosity measuring device 1 is fed the verification density $\rho_2$ and/or verification viscosity $\eta_2$ as well as in given cases the second temperature $T_2$ ascertained by the MEMS-based master or control density measuring device 10. The connecting of the measuring devices can occur, for example, via a digital or analog interface 18 to the devices and the flow computer. The flow computer 17 is adapted, furthermore, to perform a verifying of the density and/or viscosity ascertained by the density and/or viscosity measuring device based on the verification density $\rho_2$ and/or verification viscosity $\eta_2$ ascertained by the temporarily connected, MEMS-based, master or control density measuring device, the ascertained temperatures $T_1$, T and $T_2$ and the pressure p.

Since all measurements occur essentially simultaneously, it can be assumed that the medium was the same. And, for each measuring station set, a measurement error can be ascertained for the currently reigning measuring conditions (T, p, $\rho$, $\eta$ . . . ) using the following Equation 1:

$$e\_\rho_1(T, p, \rho, \eta, \ldots) = \rho_1 - \rho_2 - A^*(T_1 - T_2) - B^*(p_1 - p_2) \tag{1}$$

wherein $e\_\rho_1$ is a process condition-dependent, measurement error, A is a temperature coefficient and B the pressure coefficient of the medium of density $\rho_1$ at the current process conditions T and p.

A compensation of the pressure difference between the two density sensors can typically be omitted, since the influence of the pressure (for gasoline, B=0.08 kg/m$^3$ bar$^{-1}$) on the fluid density is small and the measuring occurs at practically equal pressure p, so that Equation 2 results:

$$e\_\rho_1(T, p, \rho, \eta \ldots) = \rho_1 - \rho_2 - A^*(T_1 - T_2) \tag{2}$$

Temperature compensation is useful at temperature differences >0.1 K, since, for gasoline, A=−0.9 kg/m$^3$ S$^{-1}$). At temperature differences of less than or equal to 0.1 K, further simplification leads to Equation 3:

$$e\_\rho_1(T, p, \rho, \eta \ldots) = \rho_1 - \rho_2 \tag{3}$$

All ascertained process condition dependent measurement errors can be stored in the flow computer and used for compensating future density and viscosity measurements. In such case, for ascertaining the measuring error in the case of measurement at process conditions, in the case of which no verification point is present, interpolation is used between neighboring verification points.

Figures 2A, 2B:
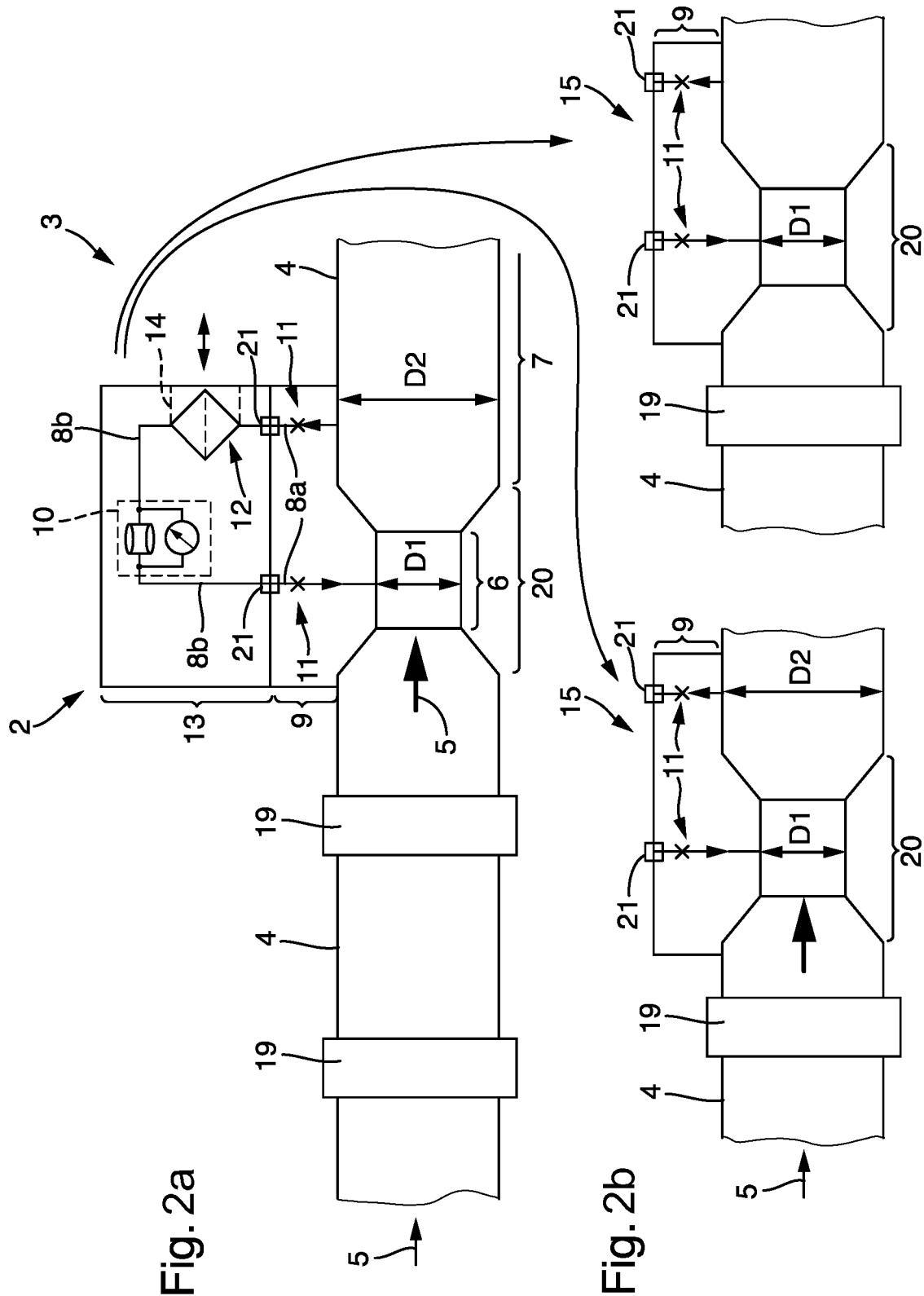
FIGS. 2a and 2b show schematic views of a second example of an embodiment of the present disclosure illustrated in greater detail.

FIGS. 2a) and b) show a second example of an embodiment of the invention, in which a plurality of measuring stations 2, 15 are shown by way of example. The measuring stations 2, 15 are located each in a main channel 4, through which a medium 5 flows in ongoing operation of the process installation. The measuring stations are, in such case, usually, not fluidically connected together, but, instead, installed in a plurality of different fluid paths in different portions of the plant, which are, most often, operated with different media.

The media may comprise a hydrocarbon. Examples are crude petroleum, gasoline, kerosene, gasoline, diesel, heating oil, heavy oil, mineral oil, lubricating oil, biodiesel, ethanol, methanol, cooking oil, etc. The main channels 4 are embodied in the regions of the measuring stations with a cross-section change 20, in such a manner that at least two regions 6, 7 with mutually differing diameters $D_1$, $D_2$ are present. Arranged in the main channel 4 for each measuring station 2, 15 is, in each case, at least one measuring unit 19 composed of a density and/or viscosity measuring device 1 for determining a primary density and/or viscosity variable of the medium 5 and a temperature and pressure measuring device 16.

The measuring stations 2, 15 comprise, furthermore, in each case, a main channel adapter 9, which is connected mechanically to the main channel 4, for example, by means of a screwed assembly (not shown). Embodied in each main channel adapter 9, for example, as a result of corresponding bores, are parts 8a of a side channel. The main channel adapter 9 is arranged in such a manner relative to the main channel 4 that the two parts 8a of the side channel formed in the main channel adapter are fluidically connected to the two regions of different diameter of the main channel.

Connected to a main channel adapter 9 connected to the main channel 4 can be, such as shown in the measuring station shown in FIG. 2a, a sensor adapter 13. The sensor adapter 13 includes the MEMS-based master or control density measuring device 10 applied temporarily for verification. For this, the sensor adapter 13 and the main channel adapter 9 are matched to one another in such a manner that the sensor adapter 13 is connectable mechanically releasably to the main channel adapter 9. Furthermore, for a fluidic connecting of the part 8a of the side channel formed in the main channel adapter to the part 8b of the side channel continued in the sensor adapter 13, a rapid coupling system 21 can be provided, which enables a fluidic connecting of the two side channel parts during ongoing operation. The rapid coupling system 21 is embodied in such a manner that the two parts 8a, 8b of the side channel can be fluidically disconnected, when the sensor adapter is mechanically disconnected from the main channel adapter. Furthermore, the main channel adapter 9 includes two valves 11, which in the case of a connected master or control density measuring device 10, are switched open, so that the medium 5 can flow through the part 8a of the side channel formed in the main channel adapter 9 and into part 8b of the side channel continued in the sensor adapter 13, and which in the case of a not connected master or control density measuring device 10 are switched closed, so that no medium can escape.

This means that the valves are embodied and arranged in the main channel adapter in such a manner that the medium only flows through the side channel, when a MEMS-based master or control density measuring device 10 is mechanically connected to the main channel adapter 9. Furthermore, this means also that the side channels 8a, 8b form a bypass of the main channel 4. The particular embodiment of the cross-section change determines the flow direction of the medium through the side channel 8a, 8b. In the preferred example shown in FIG. 2a), the cross-section change of the main channel is so embodied that the medium 3 flows, firstly, through a region with a smaller diameter $D_1$ before it flows through a region with a greater diameter $D_2$. The has the result that the medium 3 flows counter to the flow direction in the main channel 4 through the side channel 8a, 8b, when the valves 11 are open. Such is shown in FIGS. 2a) and b) by two arrows indicating the flow direction in the side channel. Alternatively, the cross-section change 20 can, however, also be embodied exactly oppositely, so that the medium 3 flows, firstly, through a region with a greater diameter before it flows through a region with a smaller diameter. This is, for example, the case, when the flow in the main channel flows in the opposite direction from that shown in FIG. 2a). In such case, the medium 3 would flow through the side channel in the same direction as in the main channel, so that the side channel is always flowed through in the same direction, independently of the flow direction in the main channel.

To protect the MEMS-based master or control density measuring device 10 from possible particles in the medium 3, at least one filter element 12 can be provided in the sensor adapter 13. In order to be able to replace the filter element 12, a filter holder 14 can be provided, via which the filter element 12 is kept in a predetermined installed position in the sensor adapter 13. The predetermined installed position is determined in such a manner in the sensor adapter that in the flow direction the filter element is arranged in the side channel before the MEMS-based master or control density measuring device 10. Furthermore, the filter element 12 can for replacement be released via the filter holder 14 from the predetermined position and, for example, removed laterally from the sensor adapter 13.

FIG. 2a) shows a measuring station 2, in which the MEMS-based master or control density measuring device 10 is brought via the main channel adapter into the measuring station with two in series (redundantly) arranged measuring units 19 for a short time for performing a verification measurement. Furthermore, shown in FIG. 2b) for illustrating an aspect of the invention are two other measuring stations 15, which are preferably introduced in the building of the process installation, so that they are prepared for a later temporary connecting of the MEMS-based master or control density measuring device. In this way, the additional measuring stations 15 can be verified with the aid of the same master or control density measuring device 10. Such is indicated in FIGS. 2a) and b) by arrows. An advantage of the invention is, thus, that verifying a plurality of density and/or viscosity measuring devices in the process installation can be performed by means of a single MEMS-based master or control density measuring device 10.

Figure 3:
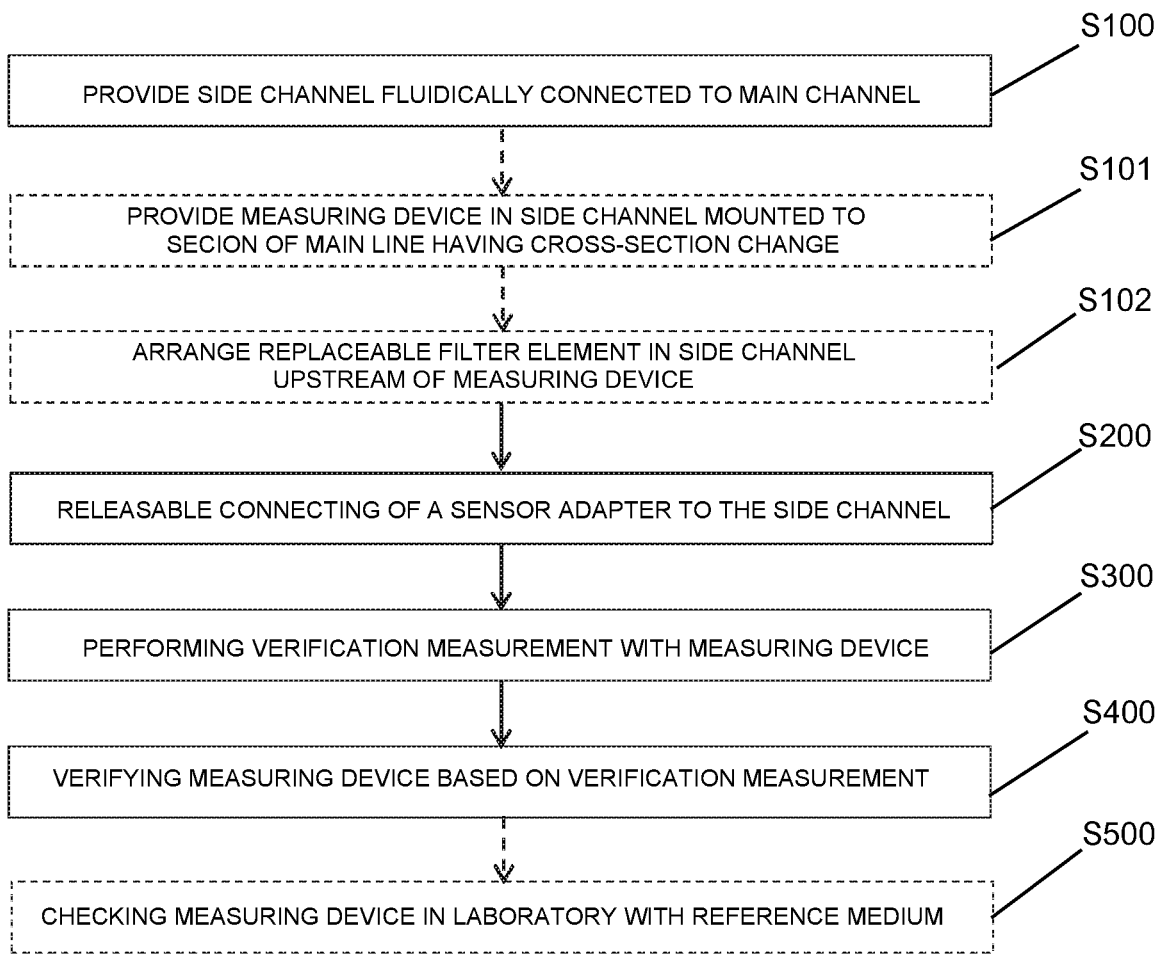
FIG. 3 shows a schematic process flow diagram of the method of the present disclosure.

FIG. 3 shows schematically a process flow of the method of the invention for verifying a density and/or viscosity measuring device. The density and/or viscosity measuring device is located in a measuring station of a process installation and serves for determining density and/or viscosity of a medium, which flows through the main channel in ongoing operation of the process installation.

The method includes in a first method step S100 that a side channel is provided embodied fluidically as a bypass of a main channel. The side channel is especially provided in an optional intermediate step S101 by an above described main channel adapter, which is mounted, for example, with the assistance of two flanges, to a section of the main line having a cross-section change. The main channel adapter is preferably adapted to control flow of the medium through the side channel in such a manner that the medium only flows through the side channel, when the MEMS-based master or control density measuring device is connected to the main channel adapter. Such can be implemented, for example, by two valves, preferably check valves, which are arranged in the part of the side channel formed in the main channel adapter.

In order to protect the MEMS-based master or control density measuring device from a possible fouling by, for example, particles in the medium, in an optional intermediate step S102 a replaceable filter element can be arranged in the side channel in the flow direction before the MEMS-based master or control density measuring device.

The method provides, furthermore, in a second method step S200 that a MEMS-based master or control density measuring device for a verification measurement is provided by the mechanically releasable connecting of a sensor adapter to the main channel adapter. Preferably, the MEMS-based master or control density measuring device is provided only temporarily for performing the verification measurement at the measuring station. After the verification measurement, the MEMS-based master or control density measuring device can be removed from the measuring station and, for example, connected at another measuring station for another verification measurement.

In a third method step S300, the method of the invention provides that at least one verification measurement is performed with the MEMS-based master or control density measuring device at the measuring station during ongoing operation. Because of the verification measurement, a verification density and/or a verification viscosity is/are ascertained by the MEMS-based master or control density measuring device. The verification density and/or the verification viscosity is sent to a flow computer, to which are fed also the density and/or viscosity measured by the density and/or viscosity measuring device to be verified. The sending of the verification density and/or the verification viscosity can occur both electronically via an interface to the flow computer, as well as also manually or by means of another computer program independent of the flow computer.

In a next method step S400, a verifying of the density and/or viscosity measuring device is performed based on the verification measurement performed earlier by the MEMS-based master or control density measuring device. Preferably, the verification is performed by the flow computer.

In a last, in given cases also first, optional step (S500), the checking of the master or control density measuring device occurs in a laboratory with a reference medium, which was measured by means of a measuring procedure based on a national standard.

The invention claimed is:

1. A method for verifying a density measuring device in a measuring station of a process installation during ongoing operation in which a medium flows through a main channel of the process installation, the method comprising:
   providing a side channel, which is fluidically connectable to the main channel via two sections of the main channel having mutually differing diameters, wherein the side channel is configured to enable a parallel flow therethrough relative to the flow through the main channel;
   providing a microelectromechanical systems-based (MEMS-based) master density measuring device in the side channel such that the medium flows through the MEMS-based master density measuring device when fluidically connected to the main channel;
   providing a main channel adapter, which is arranged in or at the main channel and which is configured to control flow of the medium through the side channel such that, only when the MEMS-based master density measuring device is mechanically connected to the main channel adapter, the medium flows through side channel;
   connecting the side channel, including the MEMS-based master density measuring device, to the main channel adapter, wherein the medium flows through both the main channel and side channel;
   performing at least one verification measurement with the MEMS-based master density measuring device; and
   verifying the density measuring device based on the at least one verification measurement performed by the MEMS-based master density measuring device.

2. The method of claim 1, wherein the MEMS-based master density measuring device is connected releasably to the main channel adapter and is flowed through by the medium only for the at least one verification measurement.

3. The method of claim 1, further comprising providing at least one replaceable filter element in the side channel, wherein the filter element is arranged, relative to a flow direction of the medium, upstream of the MEMS-based master density measuring device such that the medium is filtered before entry into the MEMS-based master density measuring device.

4. The method of claim 1, further comprising disconnecting the MEMS-based master density measuring device from the main channel adapter after the at least one verification measurement in ongoing operation.

5. The method of claim 1, further comprising recurringly checking the MEMS-based master density measuring device in a laboratory with a reference medium, which was measured using a measuring procedure based on a national standard.

6. The method of claim 1, wherein the MEMS-based master density measuring device is applied at another measuring station for verification of another density and/or viscosity measuring device and the other measuring station includes an additional main channel adapter to which the MEMS-based master density measuring device is mechanically connected.

7. The method of claim 1, wherein the MEMS-based master density measuring device is mounted sealed at the main channel adapter.

8. The method of claim 1, wherein for verifying the density measuring device, a temperature and/or a pressure representative for the measuring station in ongoing operation is taken into consideration.

9. An apparatus for verification of a density measuring device in a measuring station of a process installation during ongoing operation using a microelectromechanical systems-based (MEMS-based) master density measuring device, wherein the measuring station comprises:
   a main channel through which, in ongoing operation of the process installation, a medium flows, wherein the main channel includes at least two sections with mutually differing diameters;
   the density measuring device arranged in or at the main channel and configured to determine a primary density variable of the medium;
   a side channel, which is releasably connected fluidically in the at least two sections to the main channel as to enable a parallel flow through the side channel relative to the flow through the main channel;
   a main channel adapter, which is arranged in or at the main channel and which is configured to control flow of the medium through the side channel such that the medium only flows through the side channel when the MEMS-based master density measuring device is mechanically connected to the main channel adapter; and
   the MEMS-based master density measuring device, which is arranged in the side channel and configured to determine a density value of the medium during ongoing operation, wherein the density value enables verifying the primary density variable determined by the density-measuring device.

10. The apparatus of claim 9, further comprising a sensor adapter comprising the MEMS-based master density measuring device, wherein the sensor adapter and the main channel adapter are configured to complement each other such that the sensor adapter is connectable mechanically releasably to the main channel adapter and such that only in a connected state does medium flow through the side channel formed in the main channel adapter and sensor adapter.

11. The apparatus of claim 10, wherein the sensor adapter includes at least one replaceable filter element, which is arranged, relative to a flow direction of the medium, upstream of the MEMS-based master density measuring device such that the medium is filtered before entry into the MEMS-based master density measuring device.

12. The apparatus of claim 11, wherein the sensor adapter includes a filter holder, which is configured to hold the filter element in an installed position in the sensor adapter such that the filter element is flowed through by the medium and is configured to release the filter element such that the filter element can be replaced.

13. The apparatus of claim 9, further comprising another measuring station including an additional main channel adapter configured to mechanically and fluidically connect the MEMS-based master density measuring device.

14. The apparatus of claim 9, further comprising a flow computer, which is adapted to verify the primary density variable of the medium determined by the density measuring device based on the density value of the medium determined by the MEMS-based master density measuring device in ongoing operation of the process installation.

15. The apparatus of claim 14, further comprising a temperature and/or pressure measuring device configured to determine a temperature and/or a pressure representative of the medium flowing through the measuring station, wherein the temperature and/or the pressure is supplied to the flow computer, and the flow computer is configured to consider the temperature and/or the pressure representative for the measuring station for verifying the primary density variable.

16. The apparatus of claim 10, wherein the main channel adapter and the sensor adapter include a quick-connect system, which effectuates a fluidic connecting of a part of the side channel formed in the main channel adapter to a part of the side channel formed in the sensor adapter.

17. The apparatus of claim 16, wherein the quick-connect system is configured such that the two parts of the side channel can be disconnected from one another after the fluidic connecting.

18. The apparatus of claim 9, wherein the apparatus is configured to operate upon the medium, wherein the medium contains a hydrocarbon.

* * * * *